Nov. 26, 1968 J. L. WILLIAMS ET AL 3,412,972
BONNETLESS GATE VALVE WITH SIDE THRUSTING PACKING BOX
Filed Sept. 21, 1964 2 Sheets-Sheet 1

JOHN L. WILLIAMS
RUSSELL W. BUNCH
INVENTORS.

BY BUCKHORN, BLORE, KLARQUIST & SPARKMAN
ATTORNEYS

Nov. 26, 1968   J. L. WILLIAMS ET AL   3,412,972
BONNETLESS GATE VALVE WITH SIDE THRUSTING PACKING BOX
Filed Sept. 21, 1964                    2 Sheets-Sheet 2
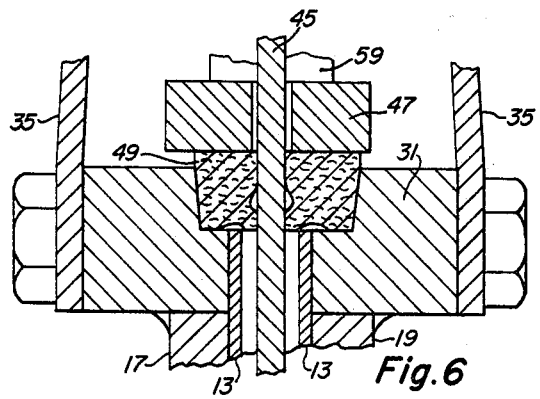
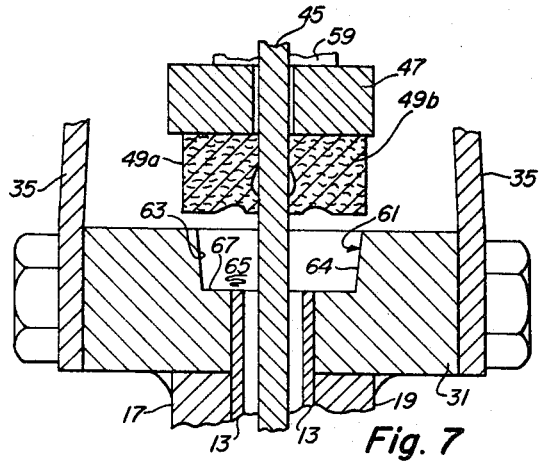
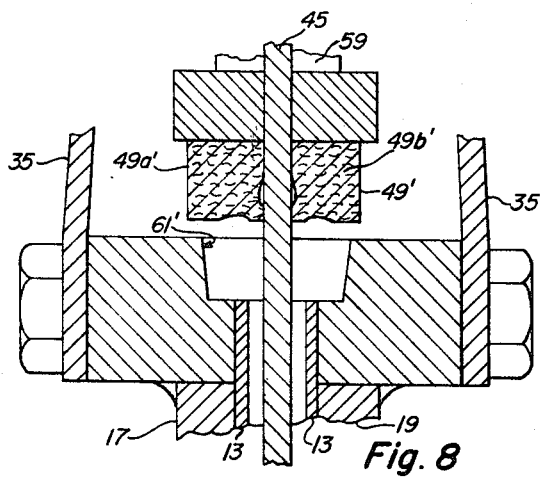
JOHN L. WILLIAMS
RUSSELL W. BUNCH
INVENTORS.
BY
BUCKHORN, BLORE, KLARQUIST & SPARKMAN
ATTORNEYS

United States Patent Office 3,412,972
Patented Nov. 26, 1968

3,412,972
BONNETLESS GATE VALVE WITH SIDE THRUSTING PACKING BOX
John L. Williams, Lake Oswego, and Russell W. Bunch, Portland, Oreg., assignors to Fabri-Valve Company of America, Portland, Oreg.
Filed Sept. 21, 1964, Ser. No. 397,702
1 Claim. (Cl. 251—203)

This invention relates to gate valves, and more particularly to bonnetless gate valves of the type wherein the gate blade seats against a single seat in the flow passage of the valve body to control the flow of fluid through the valve.

In my prior patent Reissue 24,401, a slidable packing box is disclosed which can be adjusted to accommodate the position of the blade when the blade is seated against the seat, or the packing box can be adjusted to dispose the blade against its seat. In my patent, Reissue 24,735, the inverted packing box enables adjustment of the position of the blade so that it can properly seat against its seat. In both of these patented constructions, once an adjusted position of the blade has been achieved, such position is maintained by the mounting structure of the box.

A main object of the present invention is to provide a bonnetless gate valve having a packing arrangement that positively moves the blade toward and presses the blade against its seat as the packing arrangement is tightened up, and continuously presses the blade against its seat after the tightening up operation is completed so as to attain a positive and effective seal between the blade and its seat.

A more specific object of the invention is to provide a bonnetless gate valve having a packing arrangement in which the packing is on the body in surrounding relation to the blade and wherein packing which surrounds the blade is pressed into the recess by a pressure unit, and wherein the recess and packing have an offset or eccentric relation to one another so that when the packing is pressed into the recess, side thrust pressures are created against the blade pressing it into firm and positive engagement with its seat.

Various other objects of the invention will be apparent from the following description taken in connection with the accompanying drawings wherein:

FIG. 6 is an enlarged fragmentary view of a portion of FIG. 2, better showing the packing arrangement;

FIG. 7 is a view like FIG. 6 showing the packing prior to being pressed into its recess; and FIG. 8 is a view like FIG. 6 showing a modified form of the invention.

Figure 1:
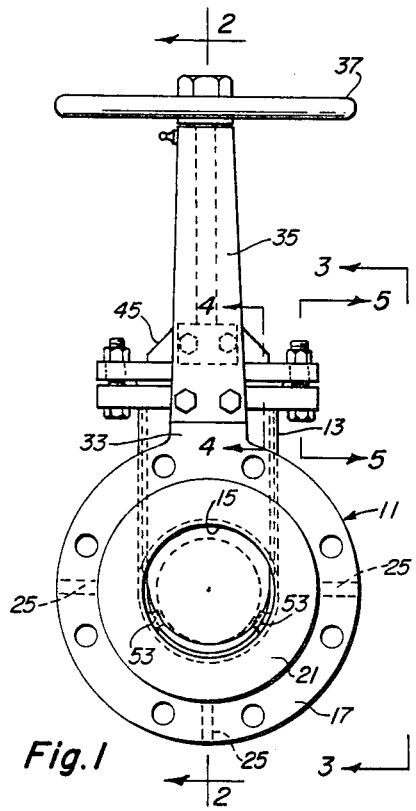
FIG. 1 is an elevational view of a bonnetless gate valve embodying the concepts of the present invention showing the gate valve in its closed position.
Figures 2, 3:
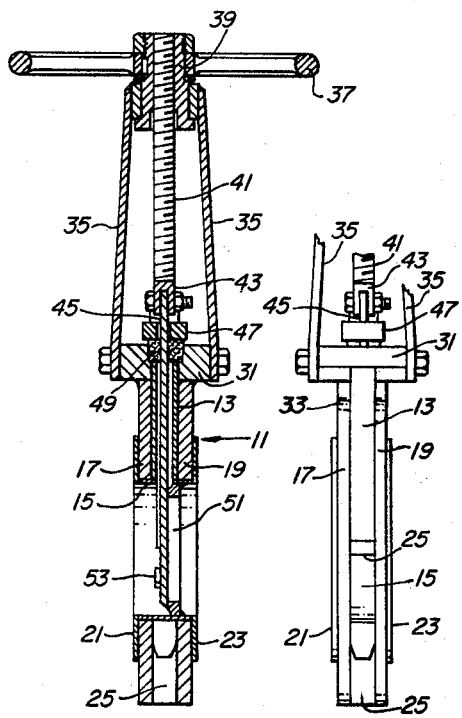
FIG. 2 is a vertical sectional view taken along line 2—2 of FIG. 1.
FIG. 3 is a partial side elevational view of the valve taken in the direction of the arrows 3—3 of FIG. 1.

Referring to the drawings, the novel packing arrangement of my invention is shown incorporated in a particular type of bonnetless gate valve, but it is to be understood that this showing is exemplary and is not intended to be limiting on the invention. The valve shown includes a fabricated valve body 11 made up of a chest portion 13 and a "can" or flow passage portion 15 to which the chest portion is permanently secured. The chest portion is reinforced by two heavy bolting flanges 17 and 19 which are secured to the chest and to the can 15. Facing ring flanges 21 and 23 are secured to the outer faces of the bolt flanges. Spacer pieces 25 are secured between and to the bolt flanges 17 and 19.

The valve body includes a packing box plate 31 which surrounds and is secured to the upper end of the chest 13 and is also secured to projecting portions 33 (FIG. 1) of the bolt flanges 17 and 19. The packing box plate supports a pair of hand wheel supporting arms 35 which rotatably support a hand wheel 37 in an axial stationary position by means of a nut assembly 39 of conventional form.

Figure 4:
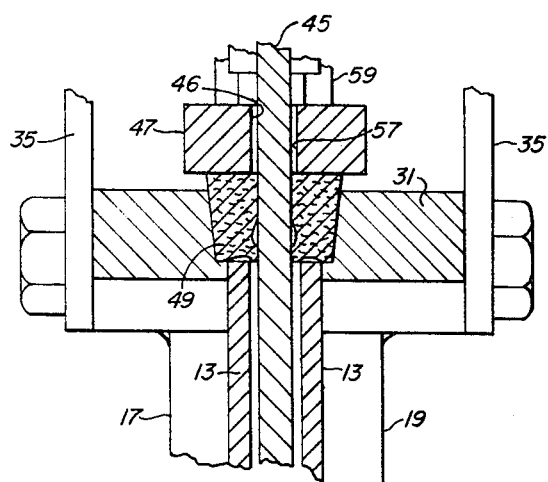
FIG. 4 is an enlarged vertical fragmentary sectional view taken along line 4—4 of FIG. 1.
Figure 5:
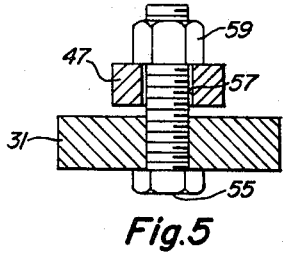
FIG. 5 is an enlarged vertical fragmentary sectional view taken along line 5—5 of FIG. 1.

A threaded stem 41 is threadedly received through the nut assembly 39 and at its lower end has a clevis 43 connected to the upper end of a gate blade 45. The blade extends downwardly through a central elongate opening 46 (FIG. 4) in a pressure plate 47, through loop-shaped packing 49, and then extends into the chest 13 and projects into the flow passage where it seats against a ring-type seat 51. The seat is secured to the can 15 and a pair of cams 53 urge the blade against the seat. Bolts 55 (FIGS. 1 and 5) pass upwardly through holes in the packing box plate 31 and then through holes 57 (FIG. 5) in plate 47. The plate 47 is tightened down by nuts 59 on the bolts 55.

Referring particularly to FIG. 7, it is evident that the packing box plate 31 has a recess 61 defined by downwardly and inwardly tapering side walls 63 and 64, and end walls 65, and by a bottom wall 67. The faces of the upper ends of the chest 13 form an inward continuation of the bottom wall 67. It is further evident that the recess is wider in the direction of side wall 64 (relative to the centerline of the valve) than in the direction of the side wall 63. On the other hand, each of the reaches 49a and 49b of the packing are of the same width (the width dimension being considered in the horizontal plane), and such width dimension is greater than the width of the recess 61 from the blade 45 to the side wall 64 and substantially greater than the recess width from the blade to the side wall 63. Thus, when the pressure plate 47 is tightened down to force the packing 49 into recess 61, the unit pressure of the packing to the left of the blade (as the parts are shown in FIG. 6) is greater than to the right of the blade. Hence the blade is urged to move and does move to the right and thus pressed in firm engagement with the seat 51. It is contemplated that best results will be obtained with packing that is somewhat resilient, at least resilient enough to apply a continuous latent thrust force against the blade, when such packing is forced into its recess. If inelastic packing is employed, side movement of the blade could be obtained but maintenance of such force or pressure would not occur if wear between the blade and seat occurred. In other words, the latter arrangement would have advantages over certain prior valve constructions but would not have all the advantages of the preferred form of the invention having elastic packing.

It is pointed out that the slot 46 in the plate 47 is oversize in the direction normal to the blade 45 so that as the plate is tightened up, the blade 45 may readily shift relative to the plate 47.

It is pointed out, that even with an eccentric or offset recess 61 as shown in FIGS. 6 and 7, it is not necessary that the two reaches of the packing 49 be of the same width. The left reach could be greater than the right, or even less, so long as the unit pressure on the left exceeded that on the right.

FIG. 8 shows a modified form of the invention in which the recess 61' is symmetrical relative to the passage or recess provided by the chest 13, while the packing 49' is asymmetrical relative to the blade 45 in that its reach 49a' is wider than its reach 49b'. Thus when the compressible packing 49' is pressed into the recess 61', the unit pressure of the packing will be greater on the left of the blade 45 than on the right, whereby the blade 45 will be forced to the right into firm sealing engagement against and with the seat 51.

In summary, side thrusting pressures on the blade can be attained with an unsymmetrical recess having associated therewith a symmetrical or unsymmetrical packing, or can be attained with an unsymmetrical packing with a symmetrical or unsymmetrical recess.

Having described the invention in what is considered to be the preferred embodiment thereof, it is desired that it be understood that the invention is not to be limited other than by the provisions of the following claims.

We claim:

1. A bonnetless gate valve having a valve body formed with intersecting chest and flow passages,
   a gate blade extending into said chest and engageable on one of its sides with a seat in said flow passage to control the flow therethrough,
   said body having a packing receiving recess surrounding said blade,
   an elongate loop type compressible packing member surrounding said blade and seated in said recess,
   said packing member comprising a pair of spaced elongate leg portions connected by end portions,
   a pressure plate means for applying pressure to said packing member and causing it to sealingly engage said blade,
   said recess being unsymmetrically disposed relative to said chest passage in a direction normal to said blade so that the portion of said recess on one side of said blade is wider than the portion on the other side of said blade,
   the narrower recess portion being on the side of the blade opposite from the side that engages the seat,
   the leg portions of said packing member being of the same cross sectional dimensions, whereby the fit of the leg portion for the narrower recess portion is tighter than the fit of the leg portion for the wider recess portion so that the pressure of said packing member on the side of said blade opposite said seat is greater than on the other side of said blade whereby to press said blade against said seat,
   the uniform cross sectional dimensions of the leg portions of said packing member enabling it to be applied in random or indiscriminate fashion to the recess without regard to which leg portion fits in which recess portion, whereby pressure against the blade towards the seat is attained regardless of which leg portion is seated in which recess portion.

References Cited

UNITED STATES PATENTS

| 2,064,567 | 12/1963 | Riley | 251—170 X |
| 3,081,974 | 3/1963 | Traut | 251—175 X |

FOREIGN PATENTS

| 523,486 | 4/1956 | Canada. |

WILLIAM F. O'DEA, *Primary Examiner.*

D. R. MATTHEWS, *Assistant Examiner.*